US007646785B2

(12) United States Patent
Mosko et al.

(10) Patent No.: US 7,646,785 B2
(45) Date of Patent: Jan. 12, 2010

(54) CYCLICAL-TRANSMISSION-SCHEDULE RESERVATION TECHNIQUE

(75) Inventors: Marc Mosko, Santa Cruz, CA (US); Ignacio Solis, Redwood City, CA (US); J. J. Garcia Luna Aceves, San Mateo, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 448 days.

(21) Appl. No.: 11/644,664

(22) Filed: Dec. 21, 2006

(65) Prior Publication Data

US 2008/0151928 A1   Jun. 26, 2008

(51) Int. Cl.
*H04L 12/43* (2006.01)
*H04W 4/00* (2009.01)
*H04B 7/212* (2006.01)

(52) U.S. Cl. .................. 370/461; 370/328; 370/348
(58) Field of Classification Search ............ 370/461, 370/328, 329, 345, 347, 348
See application file for complete search history.

(56) References Cited

U.S. PATENT DOCUMENTS

| 5,396,496 | A | 3/1995 | Ito et al. | |
|---|---|---|---|---|
| 6,118,787 | A * | 9/2000 | Kalkunte et al. | 370/445 |
| 7,411,924 | B2 * | 8/2008 | Cho et al. | 370/328 |
| 2005/0013273 | A1 * | 1/2005 | Zhang | 370/328 |
| 2005/0136937 | A1 * | 6/2005 | Qian et al. | 455/452.2 |
| 2006/0034322 | A1 | 2/2006 | Matsunaga et al. | |
| 2007/0060160 | A1 * | 3/2007 | Hur et al. | 455/450 |
| 2008/0095102 | A1 * | 4/2008 | Meng et al. | 370/329 |

OTHER PUBLICATIONS

Publication: Aggarwal, A., Guibas, L. J., Saxe, J. & Shor, P. W. (1989), *A Linear-Time Algorithm for Computing the Voronoi Diagram of a Convex Polygon*, Discrete & Computational Geometry 4, 591-604.
Publication: Bao, L. & Garcia-Luna-Aceves, J. J. (2001), *A New Approach to Channel Access Scheduling for Ad Hoc Networks*, Proc. ACM Mobicom 2001.

(Continued)

*Primary Examiner*—Derrick W Ferris
*Assistant Examiner*—Angel Brockman
(74) *Attorney, Agent, or Firm*—Park, Vaughan & Fleming LLP

(57) ABSTRACT

A communication system includes devices configured to communicate with each other through a temporal sequence of frames. Each of these frames includes multiple sub-channels. Note that a given device in the devices is configured to select sub-channels to reserve based on a nearest-neighbor spacing between the sub-channels to be reserved and/or a switching latency between data in-flow to the given device and data out-flow from the given device. Furthermore, the given device is configured to dynamically reserve the selected sub-channels on a frame-by-frame basis for up to N frames.

22 Claims, 9 Drawing Sheets

OTHER PUBLICATIONS

Publication: Chuzhoy, J. & Rabani, Y. (2005), *Approximating K-Median With Non-Uniform Capacities*, in 'SODA '05: Proceedings of the Sixteenth Annual ACM-SIAM Symposium on Discrete Algorithms', Society for Industrial and Applied Mathematics, Philadelphia, PA, USA, pp. 952-958.

Publication: Levi, R., Shmoys, D. B. & Swamy, C. (2004), *LP-Based Approximation Algorithms for Capacitated Facility Location*, in G. N. Daniel Bienstock, ed., 'Integer Programming and Combinatorial Optimization: 10th International IPCO Conference,' vol. 3064 of Lecture Notes in Computer Science, Springer, Berlin, pp. 206-218.

Publication: Radhakrishnan, V., Krumke, S. O., Marathe, M. V. & Rosenkrantz, D. J. (1993), *Compact Location Problems*, in 'Lecture Notes in Computer Science', vol. 761, Springer Verlag.

Publication: Z. Tang and J.J. Garcia-Luna-Aceves, *A Protocol for Topology Dependent Transmission Scheduling*, in Proc. IEEE Wireless Communications and Networking Conference 1999 (WCNC 99), Sep. 1999.

* cited by examiner

CYCLICAL-TRANSMISSION-SCHEDULE RESERVATION TECHNIQUE

BACKGROUND

1. Field of the Invention

The present invention relates to techniques for accessing channels in networks. More specifically, the present invention relates to scheduling techniques for use with dynamic channel-access protocols.

2. Related Art

Recent advances in networking technology have made it possible to support multiple voice-related applications, such as mobile smart phones and Voice over Wireless Internet Protocol (VoWIP), on individual networks. In the near future, these applications may be running on mobile stations concurrently with legacy data-centric applications. To support such integrated voice/data traffic in a network, the channel-access protocol (such as the Medium-Access-Control protocol) in these systems needs to provide high channel utilization and bounded channel-access delay. The former is important for data-centric applications, and the latter is critical for providing uninterrupted data delivery in voice-related (i.e., real-time) applications.

Contention-based channel-access schemes have previously been developed for multiple-hop ad-hoc networks and for wireless local area networks or LANs. However, these existing approaches are unable to provide high channel utilization as network load increases. In addition, ad-hoc networks that utilize such conventional channel-access schemes are vulnerable to collisions, which can potentially starve certain stations by preventing them from acquiring the channel. As a consequence, the existing contention-based approaches are unable to ensure an upper bound on the channel-access delay. This makes it impossible to run soft real-time applications, and even bulk transfer applications, over these networks at high loads.

'Contention-free' schemes have been proposed to overcome these limitations, thereby providing conflict-free channel access independently of the radio connectivity around any given device or node in the communication system. These contention-free schemes may be classified as 'topology independent' and 'topology dependent.' In topology-independent channel-access schemes, deterministic transmission schedules are produced that allow nodes or devices in an ad-hoc network to periodically access the communication channel without collision and also ensure a bounded channel-access delay. For example, a device may be pre-assigned one or more unique sub-channels (such as time slots) in a global schedule. However, these contention-free schemes typically require an excessive amount of control-signaling overhead and global knowledge of the network, and typically also suffer from channel under-utilization.

In contrast, topology-dependent channel-access schemes use local topology information to produce the transmission schedules. These schemes may be used to construct schedules for small groups of devices, thereby solving the under-utilization problem at high loads while only using small-area topological knowledge. For example, dynamic (randomized) channel-access schemes use probabilistic transmission schedules in which each device always has a certain probability to access the channel during a given sub-channel.

Unfortunately, while such techniques incur less control overhead than the earlier contention-free channel-access protocols, they still do not ensure a bound on channel-access delay. In particular, as the number of devices competing for sub-channels increases in the communication system, the probability of any given device winning an election for a sub-channel goes down.

Hence what is needed is a method and an apparatus that facilitates channel-access in networks without the problems listed above.

SUMMARY

One embodiment of this invention provides a communication system that includes devices configured to communicate with each other through a temporal sequence of frames. Each of these frames includes multiple sub-channels. Note that a given device is configured to select sub-channels to reserve based on a nearest-neighbor spacing between the sub-channels to be reserved and/or a switching latency between data in-flow to the given device and data out-flow from the given device. Furthermore, the given device is configured to dynamically reserve the selected sub-channels on a frame-by-frame basis for up to N frames.

In some embodiments, the selected sub-channels are selected to reduce a variance of the nearest-neighbor spacing.

In some embodiments, the selected sub-channels may be selected based on a greedy technique in which a number of sub-channels to be reserved in a given frame is selected based on a previous bandwidth requirement.

In some embodiments, the selected sub-channels may be selected to reduce a weighted average of an amount of data received times an associated transmission waiting time and/or a weighted average of the nearest-neighbor spacing and the switching latency. Furthermore, in some embodiments the selected sub-channels are selected based on the nearest-neighbor spacing for a first data class and the switching latency for a second data class.

In some embodiments, dynamically reserving the selected sub-channels involves releasing a previously reserved sub-channel and/or reserving a new sub-channel.

In some embodiments, the sub-channels correspond to time slots, frequency bands, spread-spectrum codes, and/or directional antennas that transmit and receive the frames.

Another embodiment provides a communication device for use in the communication system.

Another embodiment provides a method including operations corresponding to the functions in the above-described communication system.

Figure 1:
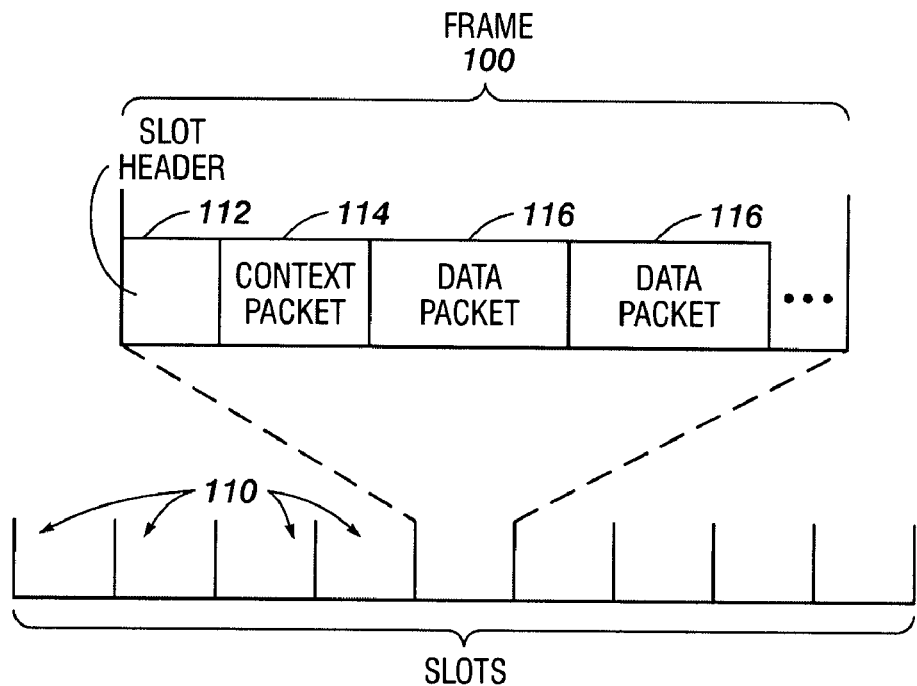
FIG. 1 is a block diagram illustrating a frame for use in a communication system in accordance with an embodiment of the present invention.

Table 1 provides exemplary pseudo-code for a reservation technique in accordance with an embodiment of the present invention.

Table 2 provides exemplary pseudo-code for a reservation technique in accordance with an embodiment of the present invention.

Table 3 provides exemplary pseudo-code for a reservation technique in accordance with an embodiment of the present invention.

Table 4 provides exemplary pseudo-code for a reservation technique in accordance with an embodiment of the present invention.

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a communication system, a method, and devices for use with the communication system are described. Communication between the devices in the communication system may be enabled by the method. In particular, nodes or devices (henceforth referred to as devices) in the communication system may communicate by exchanging a temporal sequence of frames, each of which includes multiple sub-channels. These devices may use a distributed reservation or scheduling technique to determine scheduling access by different devices to a shared communication channel in a network.

In some embodiments, sub-channels to be reserved by a given device, from frame to frame, may be determined based on jitter or variance in the nearest-neighbor spacing between the sub-channels and/or characteristics of data traffic or flow. For example, the selected sub-channels may reduce a switching latency between data in-flow to the given device and data out-flow from the given device. Note that the determined reservation schedules may be used to obtain both a high channel utilization and a bounded channel-access delay in the communication system.

Because reservations may repeat over multiple frames in the same sub-channel, the reservation problem may be visualized as an assignment problem around a ring. Therefore, the reservation technique described below is referred to as Ring Optimal Assignment Reservations (ROAR). Note that ROAR may be used in conjunction with a wide variety of channel-access protocols, including contention-based, contention-free, topology-dependent, and/or topology-independent schemes. For example, ROAR may be used with a dynamic channel-access protocol, which is also sometimes referred to as 'dynamic election.' These channel-access protocols may be used to resolve any eventual conflicts that occur in the reserved sub-channels for the devices. In an exemplary embodiment, the devices provide feedback to one another on planned reservation changes.

The method, devices, and/or communication system associated with the present invention may be utilized in a wide variety of network applications, including LANs (such as WiFi, WiMax, and/or a LAN that utilizes a communication protocol that is compatible with an IEEE 802 standard), wide area networks or WANs, metropolitan area networks or MANs, and/or cellular telephone networks (such as the Global System for Mobile communication or GSM). In addition, the method and/or communication system may include fixed and/or mobile stations, devices or nodes, and the network may utilize fixed cells and/or may be a random or ad-hoc network. And in some embodiments, the method, devices, and/or communication system may involve or include communication protocols such as time division multiple access or TDMA, frequency division multiple access or FDMA, code division multiple access or CDMA, and/or a spatial diversity technique.

Note that in the discussion that follows the term 'election' refers to a technique for assigning sub-channels to multiple competing devices in the communication system, and the term 'reservation' refers to a technique in which a device that has won a sub-channel in an election communicates to other devices in the communication system that it intends to use the sub-channel for one, two, or more frames. Furthermore, a 'scheduling technique' may include an election technique and/or a reservation technique.

We now describe embodiments of ROAR. FIG. 1 presents a block diagram illustrating a frame 100 for use in a communication system in accordance with an embodiment of the present invention. This frame includes multiple sub-channels in the form of time slots 110 (which are used as an illustrative example of a type of sub-channel). Each time slot may include a slot header 112 (including an identifier for the transmitter and the total amount of data), a context packet 114 (including information about the data flow), and/or one or more data packets 116 (which may be transmitted to different or multiple devices).

Note that frames, such as frame 100, are communicated between the devices in the communication system. These devices may reserve time slots 110 using a channel-access protocol, such as a Medium-Access-Control protocol. Furthermore, a given device may determine which, if any, of the available time slots 110 to reserve or to release based on the ROAR technique. Note that in some embodiments frame 100 includes fewer or additional components, two or more components are combined into a single component, and/or a position of one or more components may be changed.

Before proceeding, we outline the conventions that are used in the discussion. Assume that there are S slots 110 per frame. Furthermore, the number of frames per second depends on timing and hardware. In an exemplary embodiment, a frame may have a time duration between 100 and 500 ms, depending on how well the system hardware synchronizes clocks in the devices. Note that because the frames are cyclical, time slots 110 may be viewed as positions on a directed ring.

Our convention is that the ring has integer circumference S, and that the positions are labeled 1 to S in directed arcs in clockwise rotation. Furthermore, the distance metric is the arc distance between these positions. In particular, the distance metric $\delta_{CLK}$ around the directed arcs of a ring and the shortest-path distance around the surface of a circle $\delta_{ABS}$ may be expressed as $$\delta_{CLK}(u, v, S) = \begin{cases} v - u & \text{for } v \geq u \\ S + v - u & \text{otherwise} \end{cases}$$

and $$\delta_{ABS}(u, v, S) = \begin{cases} \min\{v - u, S + u - v\} & \text{for } v \geq u \\ \min\{u - v, S + v - u\} & \text{otherwise,} \end{cases}$$

where u and v are positions on the ring. Note that the triangle inequality property of the distance metric affects the complexity of the embodiments of the reservation technique. This inequality states that, given any three points forming a triangle, the sum of the lengths of any two sides is no less than the length of the remaining side. Also note that this property holds for $\delta_{ABS}$ but does not hold for $\delta_{CLK}$.

Figure 2:
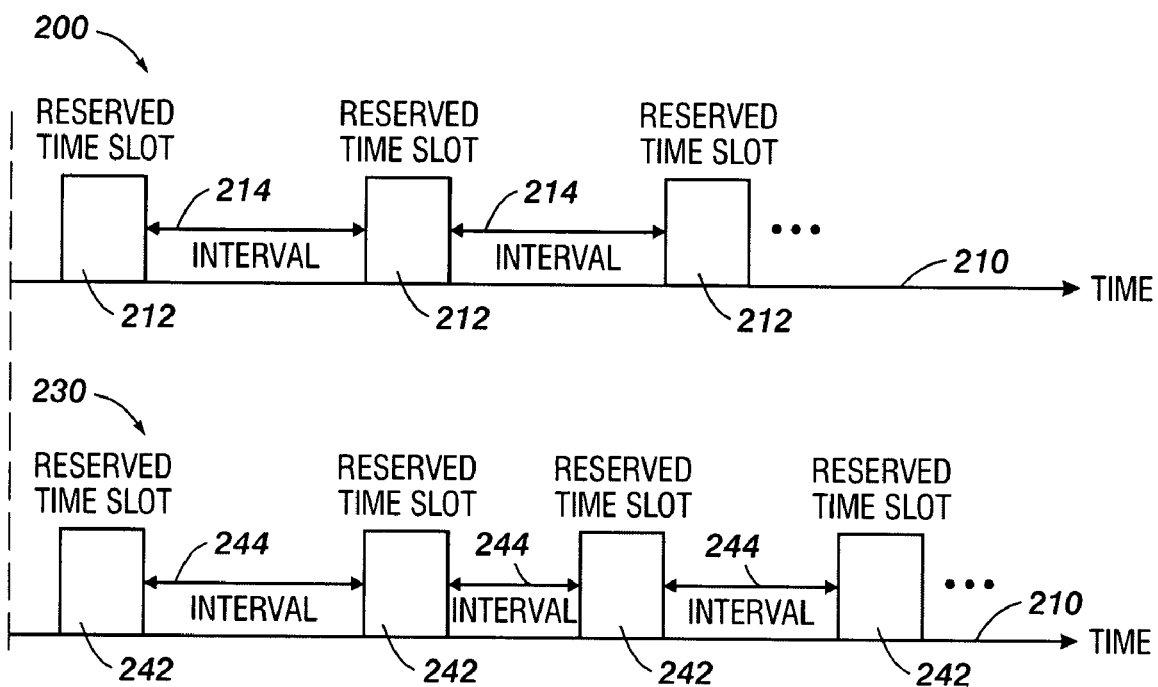
FIG. 2 is a block diagram illustrating channel-access protocols in accordance with an embodiment of the present invention.

FIG. 2 presents a block diagram illustrating channel-access protocols 200 and 230, including reserved time slots 212 as a function of time 210, in accordance with an embodiment of the present invention. Channel-access protocol 200 illustrates reserved time slots 212 based on a so-called greedy reservation technique in which a number of sub-channels to be reserved in a given frame is selected based on a previous bandwidth requirement. In this illustration, the data rate is approximately constant and the network is not overload or full. As a consequence, time intervals 214 between the reserved time slots 212 are approximately constant.

In contrast, channel-access protocol 230 illustrates reserved time slots 242 determined using the greedy reservation technique when the data flow is bursty (i.e., time varying) and/or when the network is overloaded. In this case, time intervals 246 between the reserved time slots 242 are variable in duration. As a consequence, the latency in the communication system may be increased. The embodiments of ROAR described below address this problem.

In particular, ROAR considers a reservation-assignment problem as an optimization problem over an objective function. In this reservation-assignment problem, a given device receives L[i] units of data flow in time slot i. For a given frame (such as the frame 100 in FIG. 1), the device has an existing reservation set R (i.e., a set of currently reserved time slots) and newly elected time slots W. Furthermore, the set V=R∪W, and each time slot in V has a maximum capacity C, which is the number of load data units that can be transmitted during a single time slot. We would like to find the subset V' of V that optimizes the objective, where |V'|≦K, and K is the maximum number of time slots to be reserved by the device.

Two principle variations on the reservation-assignment problem are considered. In the first variant of the problem, we wish to find V' such that inter-reservation time-slot variance is minimized, i.e., find the K time slots in V that most evenly divide the frame (assuming cyclical reservations, i.e., reservations that may be maintained over multiple frames). The resulting reservation technique is referred to as Ring Optimal Assignment Reservations by Variance (ROAR-V).

In the second variant of the problem, the switching latency is minimized. In this case, each unit of data in-flow in L is assigned to a unit of data out-flow in V'. Furthermore, the switching latency is defined as the $\delta_{CLK}$ distance from the in-time slot to out-time slot. The resulting reservation technique is referred to as Ring Optimal Assignment Reservations by Latency (ROAR-L).

Other variations are possible. For example, one may construct hybrid reservation techniques that combine aspects of ROAR-V and ROAR-L. One such approach is to use ROAR-L to minimize the switching latency of real-time data flows, and to assign any leftover reservations using ROAR-V to bulk or new data flows. In another approach, if the number of available reservations is sufficient, the communication system may perform a ROAR-L assignment for known bulk data traffic and a ROAR-V assignment for remaining reservations for new or unpredictable data flows.

Another approach uses repetitive assignments from ROAR-L for different classes of real-time data traffic, such as data traffic with hard deadlines first, then data traffic with soft deadlines, and then uses ROAR-V for bulk data traffic. However, in some embodiments, such as for data traffic with hard deadlines, greedy assignments of reservations (as illustrated in channel-access protocol 200 in FIG. 2) may be used for that class of data traffic because meeting the deadline is more important that minimizing the overall switching latency. In this case, a communication system may perform a greedy reservation assignment for hard deadlines, a ROAR-L assignment for soft deadlines, and then a ROAR-V assignment for bulk data traffic.

Figure 3:
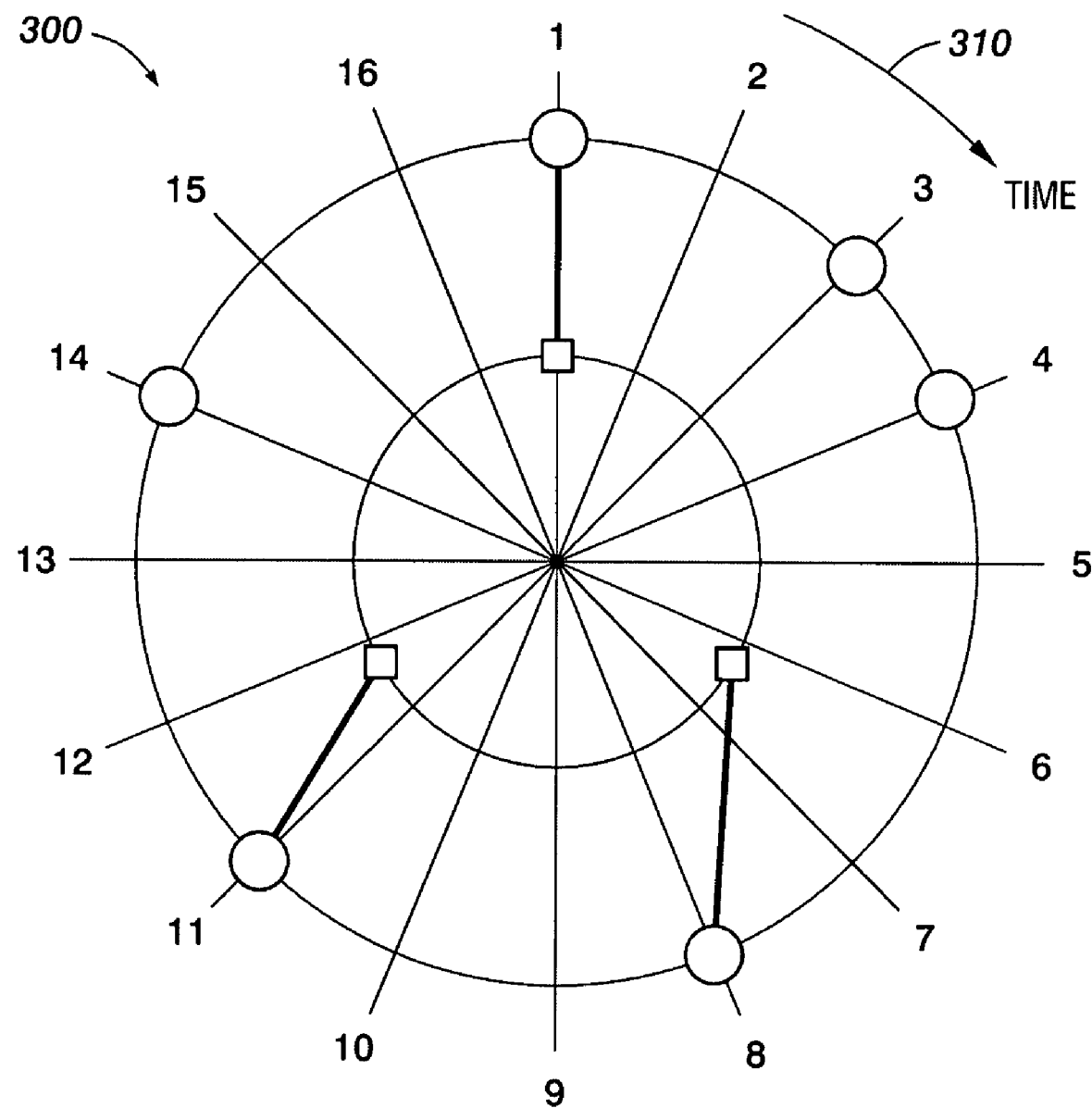
FIG. 3 is a block diagram illustrating a reservation technique in accordance with an embodiment of the present invention.
Figure 4:
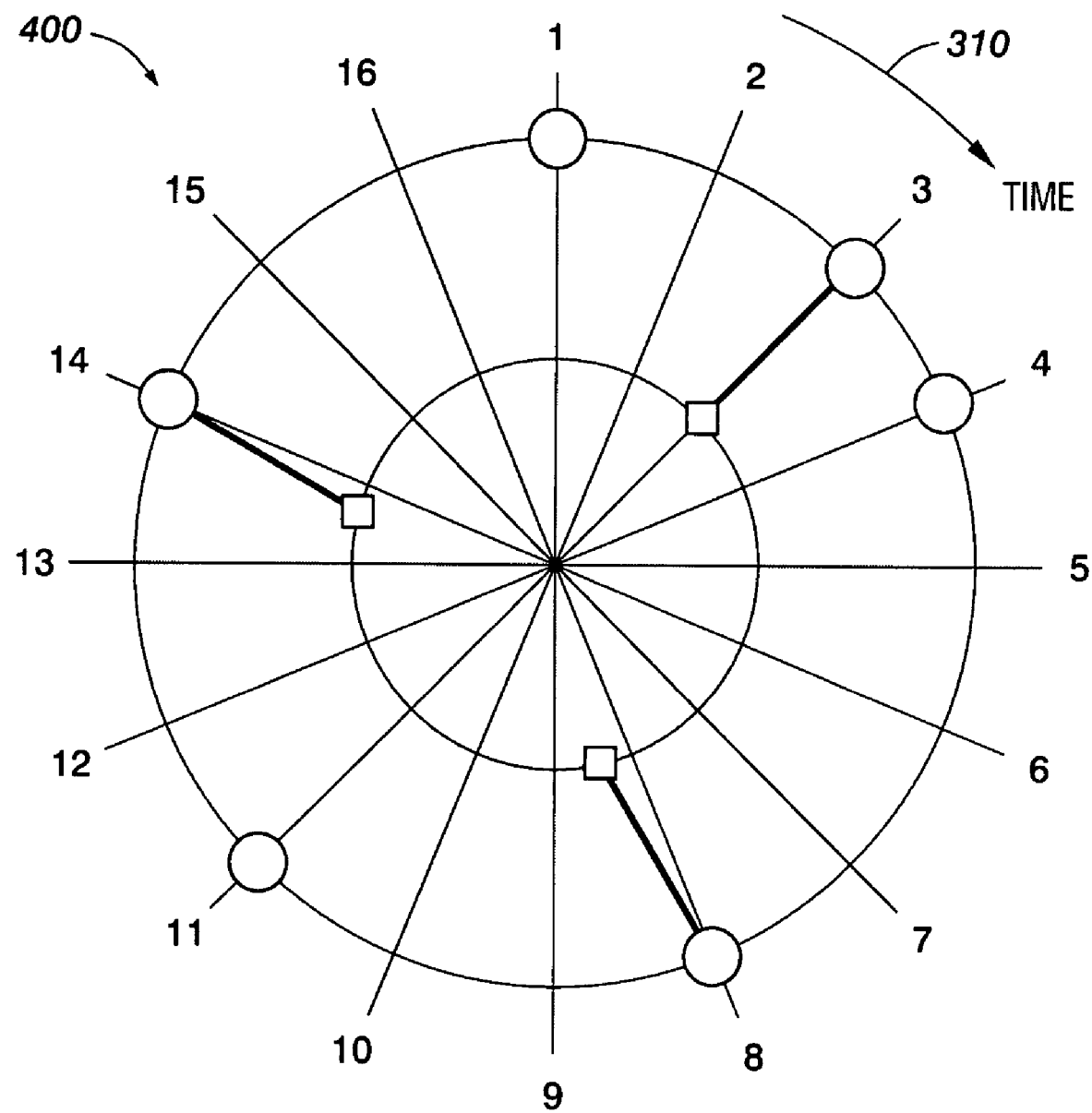
FIG. 4 is a block diagram illustrating a reservation technique in accordance with an embodiment of the present invention.

FIGS. 3 and 4 present block diagrams illustrating sub-optimal ROAR-V reservation technique 300 and optimal ROAR-V reservation technique 400 in accordance with embodiments of the present invention. As noted previously, each of the S sub-channels are indicated as hourly positions on the face of a clock, where time 310 progresses clockwise. Note that the set V includes markers for some of these positions. In particular, the inner ring represents the arrival of data load units (represented by squares) and the outer ring represents the transmission time slots, with circles showing the time slots in which the device has either won an election or has a previous reservation.

Let the set D include the minimum distances between adjacent elements or sub-channels in the set S. We wish to find the set V' of cardinality K such that the variance var($D_{V'}$) is minimum. Note that all possible solutions will have the same mean μ=S/K because of the circular (i.e., the cyclical) structure.

Note that if one considers $\delta_{CLK}$, the reservation-assignment problem by variance may be difficult because ring distances do not satisfy the triangle inequality. However, by minimizing the variance of nearest-neighbor distances around a circle using $\delta_{ABS}$, an equivalent solution may be obtained. In particular, this approach to the problem may be solved exactly using dynamic programming.

In an exemplary embodiment illustrated by the pseudo-code in Table 1 (henceforth referred to as the "Pick Best" technique), an element i in V is initially assumed to be the solution. Then, the pseudo-code in Table 2 (henceforth referred to as the "Fill Table" technique) is used to determine the set of K choices that minimize the sum of squared distances around a circle, ending again at element i. The Pick Best technique then iterates over all S starting positions, and the Fill Table technique works on the interval distances $\delta_{ABS}$ between any two elements.

Note that in the Fill Table technique, each row represents the best solution if the row elements have been chosen in addition to the implicit starting element determined by the rotation in the Pick Best technique. Furthermore, each column represents the best solution assuming that element col is in the last element in the solution. Because we must close the circle, we calculate in the Fill Table technique to K rows, which is actually a solution with K+1 elements because the starting element is counted twice.

In the Fill Table technique, row 1 is initialized to the sum of squared distances from the chosen starting element to the end of interval col. Because in row 1, we assume exactly 1 element chosen in the solution in addition to the implicit starting element, this row may be calculated as the initial condition. Furthermore, rows 2 through K are filled in by picking the element from row—1, where the sum of squared distances between the row—1 solution and the current column is minimized.

TABLE 1

```
Pick Best(V,K, S)
Convert V to intervals IV on S;
IV[i] = δ_ABS(V[i], V [(i mod d) + 1], S);
n = |V|;
best = (∞, (φ));
for i = 0 to n − 1;
    rot = Rotate V by i;
    temp = Fill Table(rot, K);
    note: last will be the final element (ss, p) that closes circle;
    last = temp[K, n];
    if last.ss < best.ss;
        De-reference path last.p to actual values in V;
        Vout = Vector[1 . . .K];
        Vout[j] = V[((last.p[j] + i) mod n) + 1];
        best = (last.ss, Vout);
return best.p;
return best;
```

Once we have filled in the table up to element m[K, n], we may read back the solution from element m[K, n]. Note that each element in the matrix m is an ordered pair (ss, p), where ss is the sum of squared distances and p is the trace-back path to allow the solution to be read. Furthermore, the element p will be an ordered set (c1, c2, . . . , cK), where ci is the column index. Therefore, reading back the solution in the Pick Best technique accounts for the rotation of the intervals IV.

TABLE 2

```
Fill Table(IV,K)
n = |IV|;
m = Matrix[1 . . .K, 1..n];
note: m is an ordered pair (ss, p);
m[1, j] = ((Σ IV[i])², (φ));
m[2..K, j] = (∞, (φ));
for row = 2 to K;
    for col = row to n;
        note: e is ordered pair (ss, last) element in m;
        e = (∞, 0);
        for k = 1 to col − 1;
            dist = Σ IV[i];
            x = m[row−1, k].ss + dist²;
            if x < e.ss;
                e = (x,m[row − 1, k].last ∪ k);
        m[row, col] = e;
return m;
```

While the time duration of the Pick Best technique is a polynomial function of time, this may not be practical for a scheduling because the available time is bounded on the order of $O(n^3K)$. For example, a device can expect n≈100 and K≈10, which would entail on the order of 10 million calculations every 200 ms (assuming a 500 ms frame, with 300 ms left over for the dynamic election and updating of the channel-access protocol). This may require several GHz of processing speed. Therefore, in some embodiments ROAR-V is presented as a heuristic approach that approximates the solutions found by the Pick Best technique. This heuristic approach runs in time $O(K \cdot n \cdot \log(n))$. Therefore, the preceding example would include on the order of 10,000 calculations every 200 ms, which could be performed using a MHz processor.

The ROAR-V reservation technique operates by fitting a minimum variance ring to the possible time slots. Reservation technique 300 shows an example where n=6 on a 16-time-slot frame and K=3. ROAR-V begins by exactly lining up the ring with one time slot, such as time slot 1. For a minimum variance ring, the mean inter-slot distance is μ=5/3, so the ring locations are at u=(1, 6/3, 22/3). For each $u_i$, we pick the nearest slot in V. In this example, the chosen slots would be v=(1, 8, 11). Note that the variance from the mean would be $\sigma^2$=3.2. In the next operation (illustrated in reservation technique 400), the ring time slots would be at u=(3, 8/3, 26/3), which would result in the chosen time slots of v=(3, 8, 14). Here, the variance from the mean would be $\sigma^2$=0.2, which in this case is the minimum possible variance so this is an optimal choice.

Figure 5:
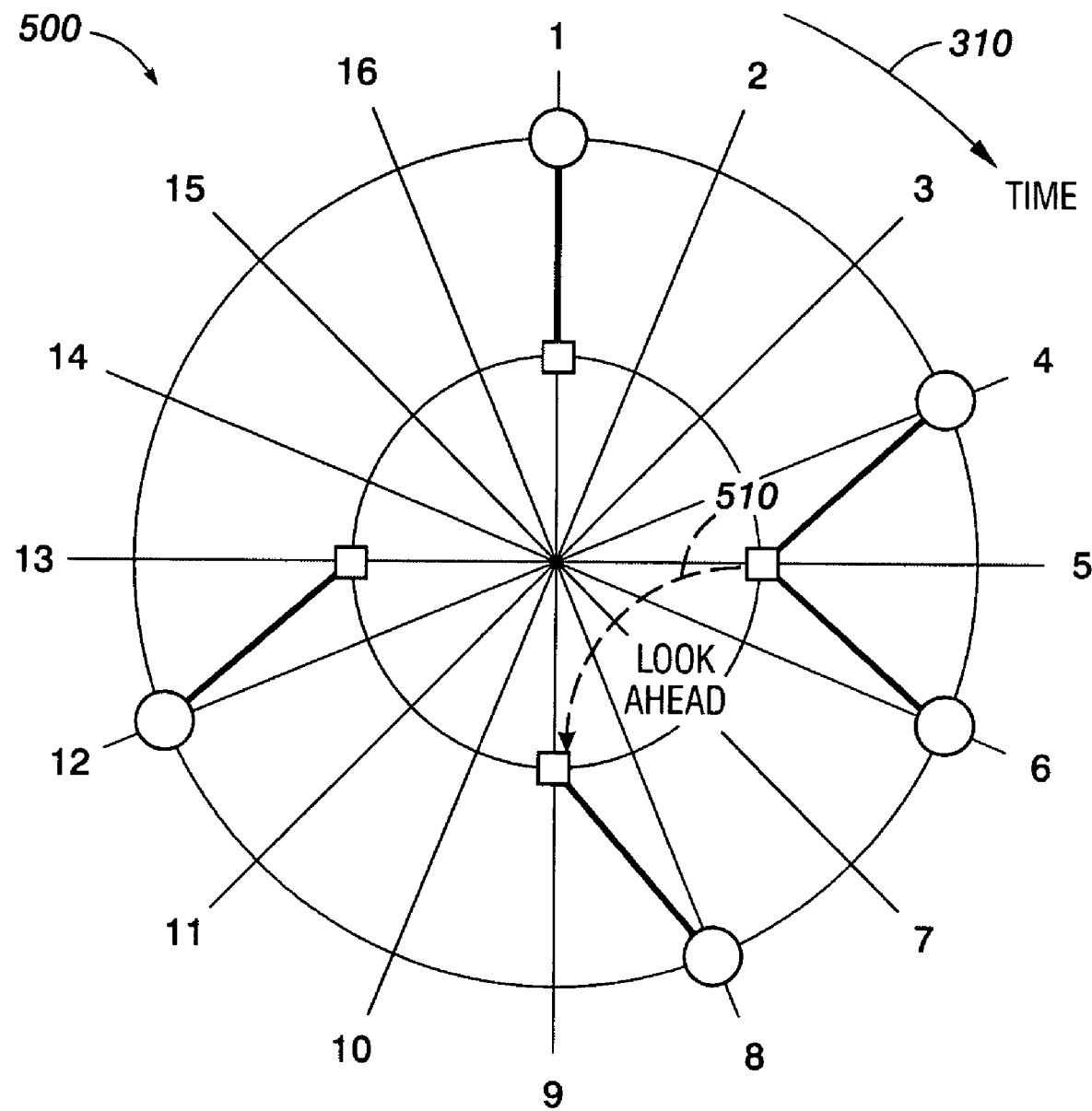
FIG. 5 is a block diagram illustrating a reservation technique in accordance with an embodiment of the present invention.

In some cases, there is ambiguity as to which time slot to pick. It may be that there are exactly one or exactly two nearest neighbors to a fitted ring time slot. This is shown in FIG. 5, which presents a block diagram illustrating a reservation technique 500 in accordance with an embodiment of the present invention. In this technique, the match for position 5 is equidistant from time slots at positions 4 and 6. Using a one-time-slot feed forward or look ahead 510, the reservation technique determines what would be the next match at position 9, and then picks the time slot that minimizes the sum of squared distance. In this case, picking time slot 4 would have a sum of squared distance of 9+16=25, and picking time slot 6 would have a sum of squared distance of 25+4=29. Therefore, time slot 4 would be picked.

Figure 6:
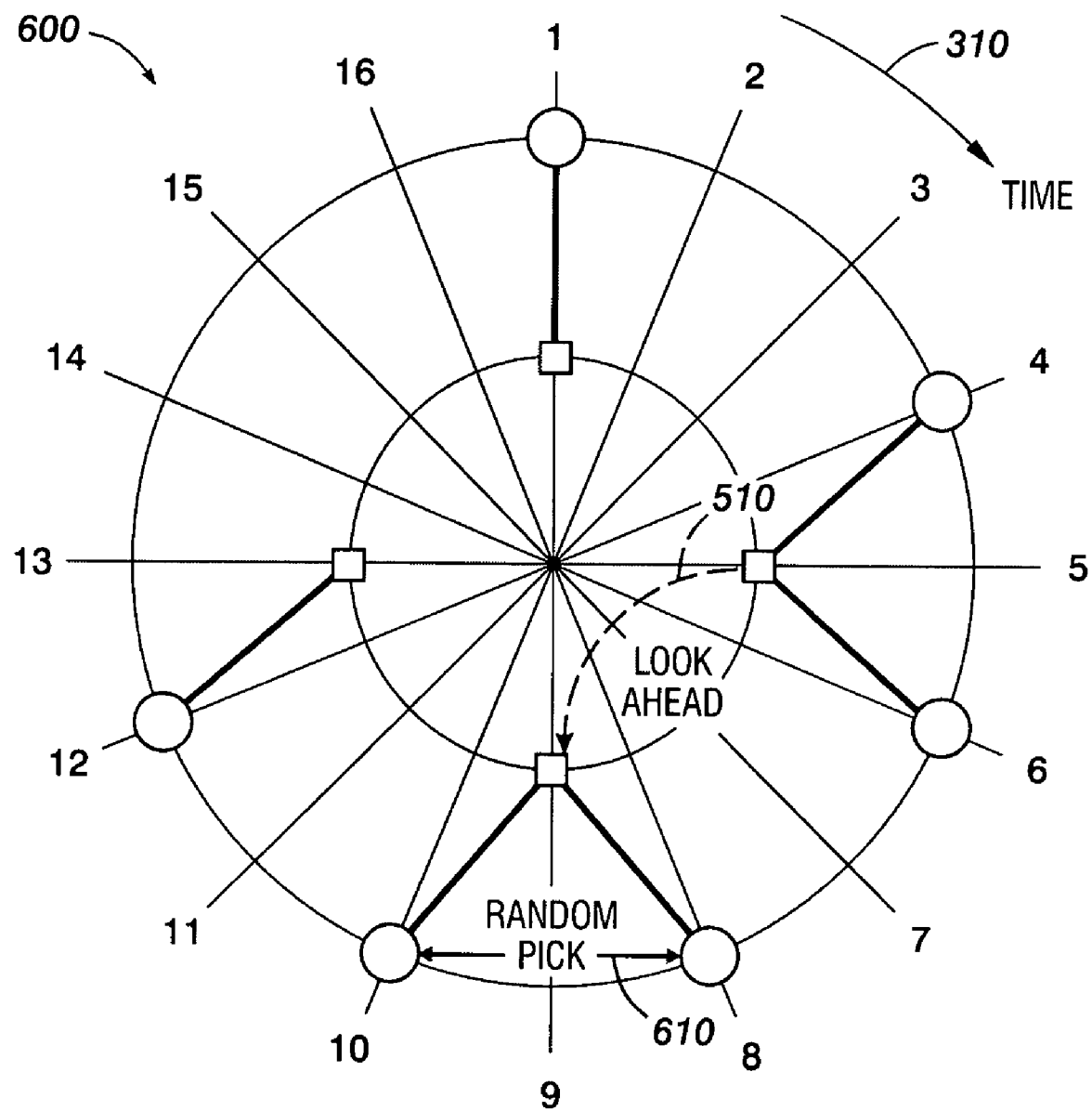
FIG. 6 is a block diagram illustrating a reservation technique in accordance with an embodiment of the present invention.

However, in some embodiments a one-time slot look ahead is also ambiguous, such as when there is a tie. This is shown in FIG. 6, which presents a block diagram illustrating a reservation technique 600 in accordance with an embodiment of the present invention. In this case, to avoid combinatorial time complexity, the reservation technique may pick one look-ahead time slot at random 610. If in this example it were to pick time slot 8, the reservation technique would proceed as described above. However, if the reservation technique were to pick time slot 10 then the sum of squared distances would pick time slot 6, which may be a sub-optimal choice in the long-run. Note that the look-ahead time-slot choice does not determine the actual time slot choice in the next iteration of the reservation technique. Of course, one may extend the one-time-slot look ahead to multiple time slots, each improving the decision made at the expense of increased runtime.

Table 3 presents pseudo-code for an embodiment of a heuristic technique for solving the reservation-assignment problem by variance (henceforth referred to as the Rotate Ring technique). In this embodiment, the Rotate Ring technique has a starting position i and matching positions i+k, where k=1 . . . (K−1). For a given starting position, the reservation technique determines the best vertex to pair with the next matching position.

TABLE 3

```
Rotate Ring(V,K, N)
d = |V|;
u = N/K;
bestv = ∞;
bestsol = V ector[1 ...K];
for i = 1 to d;
    sol = Vector[1 ...K];
    start = V[i];
    target = start + u;
    idx = 1;
    sol[pos] = i;
    solerr = 0;
    bestidx = i;
    while idx < K;
        pos = (bestidx mod d) + 1;
        bestidx = 0;
        x = Find Next(V, d, sol, pos, idx, target, K, N);
        if x = φ       note: this is an invalid configuration, stop checking;
            break;
        if |x| = 1     note: exactly 1 best match;
            bestidx = [1];
        else           note: there are 2 best matches;
        if idx = K - 1 note: we can close the ring;
            try sol[idx + 1] as x[1] and x[2], pick min variance choice;
        bestidex = best choice;
        else           note: we cannot close the ring;
            try sol[idx + 1] as x[1], x[2];
            if Find Next returns 2 items, pick one at random;
        bestidx = choice of min sum squared distance for two intervals around x[1] or x[2];
        besterr = δ_CLK(target, V [bestidx], N);
        idx = idx + 1;
        sol[idx] = bestidx;
        solerr = solerr + besterr;
        target = target + u;
        if bestidx = 0;
            v = ∞;
        else;
            v = var(sol);
        if v < bestv;
            bestv = v;
            bestsol = sol;
return sol;
```

Table 4 presents pseudo-code (henceforth referred to as the Find Next technique) that returns a set of $\{\phi\}$ (i.e., a null set), $\{i_1\}$, or $\{i_1, i_2\}$. If the return set is empty, the configuration under examination is invalid. Typically, this happens when there are not enough vertices remaining to find K of them.

Note that if the reservation technique returns one element then that is the unique best match for the current target. However, if the reservation technique returns two elements then there are two-equidistant matches from the current target. In this case, if the current target is the last of K then we pick the choice with minimum variance around the whole ring, and if the current target is somewhere in the middle of the solution, then we pick the choice that would minimize the sum of squared distances of the intervals around the current choice. Note that whenever there are equidistant choices for the one-time-step look ahead, we may pick one of them at random.

TABLE 4

```
Find Next(V, d, sol, pos, idx, t, K, N)
besterr = 2N;
bestidx = {φ};
j = idx;
note: maxidx is the maximum value we may try assigning to this position
    and leave room for K - startpos additional assignments;
maxidx = ((sol[1] + d - (K - pos)) mod d) + 1;
while j ≠ maxidx;
    err = δ_ABS(t, V [j], N);
```

TABLE 4-continued

```
    if err < besterr;
        besterr = err;
        bestidx = {j};
    else;
    if err = besterr;
        bestidx = bestidx ∪ {j};
    j = (j mod d) + 1;
return bestidx;
```

In the reservation-assignment problem by latency, we would like to find the subset V' of V, where $|V'| \leq K$, and K is the maximum number of time slots to be reserved by the device such that the total latency of switching the load from L to V' is minimized. Furthermore, the solution is subject to the constraints that there are at most C units of load per slot V', and that all units of data in-flow have data out-flow up to the maximum of K·C. Note that the switching latency is the distance $\delta_{CLK}$ times the units of data load switched.

We present embodiments of the ROAR-L reservation technique based on a greedy solution and then improve the solution using a controlled branch and bound technique. These solutions offer a short runtime, and a controllable bound on additional time spent improving the initial result to meet real-time deadlines in the communication system. Note that these solutions are determined for the restricted topology of the ring.

Figure 7:
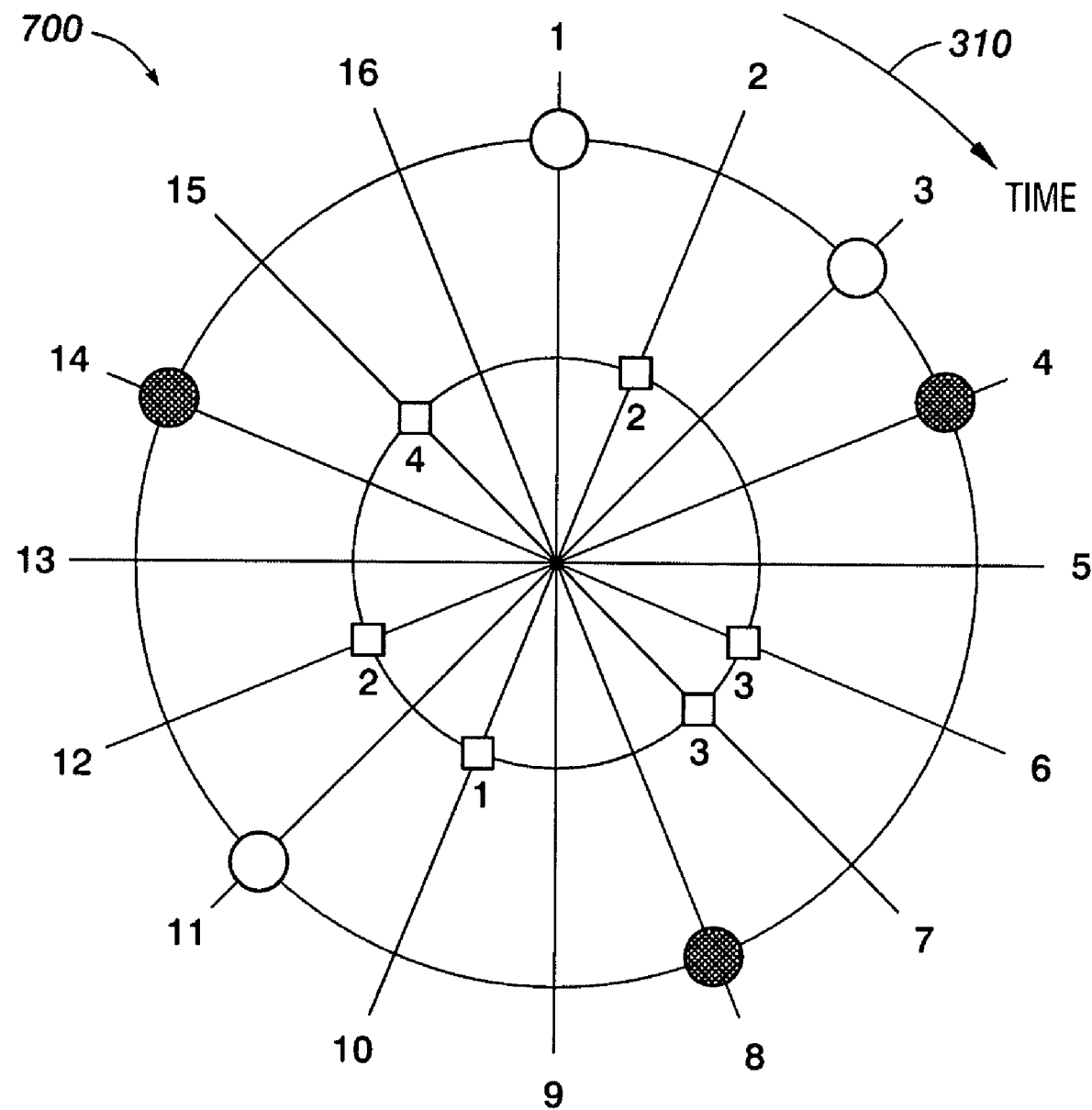
FIG. 7 is a block diagram illustrating schedule rings in accordance with an embodiment of the present invention.
Figure 8:
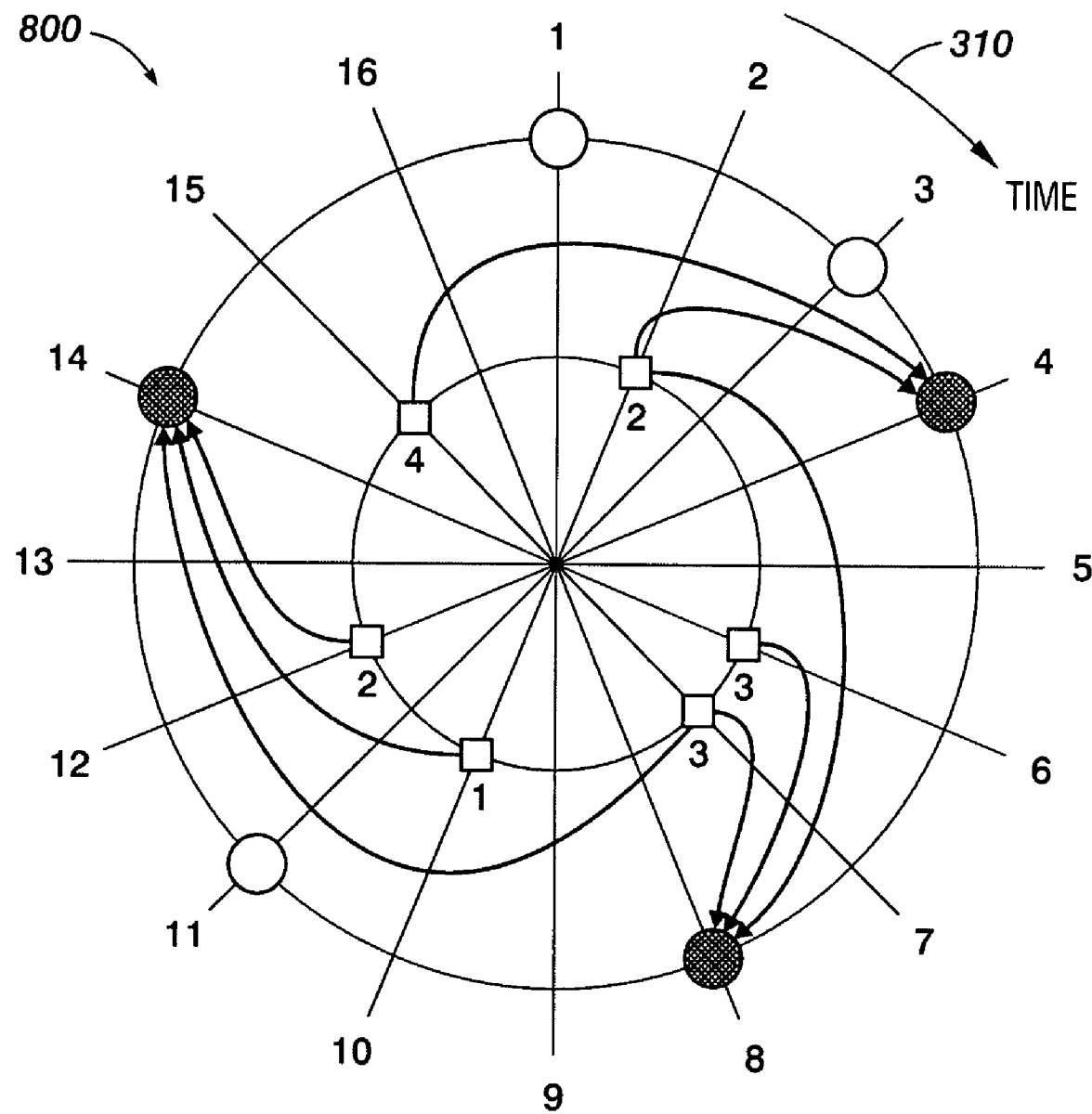
FIG. 8 is a block diagram illustrating a reservation technique in accordance with an embodiment of the present invention.

FIG. 7 present a block diagram illustrating schedule rings 700 in accordance with an embodiment of the present invention, and FIG. 8 presents a block diagram illustrating ROAR-L reservation technique 800 in accordance with an embodiment of the present invention. Note that the inner ring represents the arrival of data load units (represented by squares) and the outer ring represents the transmission time slots, with circles showing the time slots in which the device has either won an election (represented by white circles) or has a previous reservation (represented by gray circles). Furthermore, the spokes represent time slots, numbered from (1, ..., S).

Reservation technique 800 shows an example allocation of data load to time slots, where each time slot has a maximum capacity of 5 data load units. This technique uses a greedy branch-and-bound approach that is based on a binary search of the state space. As in the previous discussion, a device receives $L_i$ units of data load in time slot i. Note that the received load per time slot may vary from 0 to C integrally splitable units of data load that must be routed out of the device in an out-bound time slot.

Furthermore, the set V enumerates the possible time slots for the current frame in which the device may transmit. Thus, the device must choose a subset $V' \subseteq V$ such that $|V'| \leq K$ and that minimizes the switching latency. Note that in some cases it may be that $\Sigma L > K \cdot C$, in which case it is impossible to reserve enough capacity to switch all the received load. In this case, the choice of V' should minimize the switching latency of the reservable load $K \cdot C$.

As illustrated in FIG. 7, the set V provides |V| intervals. Let the interval Ij be the interval ending at time slot Vj. Then, $I_4$ ends at $V_4=8$, so $I_4=[5, 8]$ and the total data load received in $I_4$ is 6 units. Assuming that C=5, the minimum serviceable delay is 8 delay units, with 6 units of delay from the load received in time slot 5 and 2 units of delay from the servicable load received in time slot 6. Because of the capacity restriction, one unit of load must be deferred to another service interval and is ignored in this initial greedy assignment. Therefore, the delay in interval $I_4$ is 8. One may continue such an initial greedy allocation to all intervals in V.

Once the interval delays are know, one may greedily choose to service the interval with the maximum greedy delay by reserving the corresponding time slot. After that choice is made, the reserved time slot and the data load it services are removed from the problem. One then repeats the process, choosing the time slot that services the maximum remaining delay interval until at most K time slots are reserved.

Note that the greedy delay interval reservations just described will result in some Δ-time-slot units of scheduled delay. For example, the reservations of the gray circles in reservation technique 800 result in 51-time-slot units of delay. This becomes the initial bound for the branch-and-bound reservation technique.

Furthermore, the metric used at each branch point in the reservation technique is the total scheduled delay σ of the branch point plus the total deferred delay δ. When considering each time slot in V, the two choices are to reserve the time slot, in which case we can calculate a scheduled delay, or to remove the time slot from consideration, in which case we can calculate a deferred delay. Therefore, in some embodiments the scheduled delay is calculated as the time-slot-unit product. However, the deferred delay may be calculated differently. In particular, the deferred delay may be the incremental difference between servicing the data load by the next possible time slot and servicing the data load by the time slot just discarded, i.e., the deferred delay is the additional delay that may be incurred because the time slot under consideration is discarded. Thus, if σ+δ>Δ then the bound is exceeded and the current time slot and all child time slots may be discarded.

Note that the reason to use deferred delay instead of the total unrealized delay is to allow the reservation technique to explore more choices. In particular, the total unrealized delay would be the total time-slot-unit product to the next possible service time slot after removing a time slot. This could very quickly exceed Δ, and would not let the search explore the option of not servicing at all the intervals of maximum delay-product. Instead, we chose several smaller intervals that may still actually service K·C units of load with less delay.

Let us represent the problem as a binary tree. Each branch point of the tree is labeled by the ordered pair (r, q), where r is the residual scheduling time slots and q is the remaining unscheduled time slots. Note that the residual scheduling time slots are the number of time slots in V not yet discarded in excess of q. Furthermore, the root branch point, where all V time slots are possible, has the label (r, q), where r=|V|−K and q=K. In this case, the bound delays are zero, i.e., σ=0 and δ=0.

Choosing a time slot $V_i$, we may either reserve it or discard it. If we reserve time slot $V_i$ then the problem moves to branch point (r−1, q−1). This will have some scheduled delay realized by choosing the time slot and still zero deferred delay. Another choice is to discard time slot $V_i$, in which case the problem moves to branch point (r−1, q), with a zero scheduled delay and some deferred delay.

Note that this problem has terminal branch points (r, 0), (0, q), and those branch points in between. Terminal branch point (0, q) represents not choosing any reservations, but throwing away all the excess time slots, such that by implication one would reserve the remaining q time slots. In addition, terminal branch point (r, 0) represents not throwing away any time slots, but reserving q time slots. This is the path taken by the greedy algorithm to arrive at branching bound Δ. Furthermore, branch points in between would be, for instance, (r−1, 0), where one considered time slot was discarded and q time slots were reserved. Thus, all terminal branch points are of the form (x, 0), (0, x) or (0, 0). However, these labels are not unique and may occur many places in the decision tree.

Because this reservation technique could, in the worst case, visit all $$\frac{|V|}{Q}$$

combinations of taking Q time slots from V, the worst case runtime bound may be very large. However, the average runtime should be some constant above O(Q) because the cost metric σ+δ will not allow the reservation technique to explore too many alternatives beyond the greedy choice. Furthermore, because the reservation technique has a feasible solution at every step, it may be terminated at some runtime boundary and the best solution chosen so far may be used. Note that an alternative approach would be to use another process besides branch and bound, such as simulated annealing or other optimization techniques known in the art.

In some embodiments, if a device may reserve a time slot at any transmission opportunity then a hybrid scheme is appealing. In such a scheme, a device may reserve available time slots, up to the device maximum K, in real-time based on new arriving flows. Periodically, such as at frame boundaries, the device may use a global-heuristic reservation technique to pick the optimal K time slots to minimize the switching latency over all data flows.

For example, when a new data flow arrives, a device may reserve a new time slot in the existing frame if one exists and if the device is under its reservation limit K. However, if no such reservation exists, the device may switch the new data flow as any other, for example, by using extra capacity in reserved time slots or other available time slots. Furthermore, at the periodic optimization intervals, a device may consider all data flows and pick new reservations based on the existing reservations and newly available elected time slots. Note that if data flows are priorities, such as real-time, low-jitter, or bulk data, the reservations may be performed in rounds to optimize the highest priority traffic first.

In some embodiments, the reservation technique may select sub-channels to reduce a weighted average of an amount of data received times an associated transmission waiting time and/or a weighted average of the nearest-neighbor spacing and the switching latency. Furthermore, in some embodiments the selected sub-channels are selected based on the nearest-neighbor spacing for a first data class and the switching latency for a second data class.

Note that in some embodiments reservation technique 300 (FIG. 3), reservation technique 400 (FIG. 4), reservation technique 500 (FIG. 5), reservation technique 600 (FIG. 6), schedule rings (FIG. 7), and/or reservation technique 800 (FIG. 8) include fewer or additional components, two or more components are combined into a single component, and/or a position of one or more components may be changed.

Figure 9:
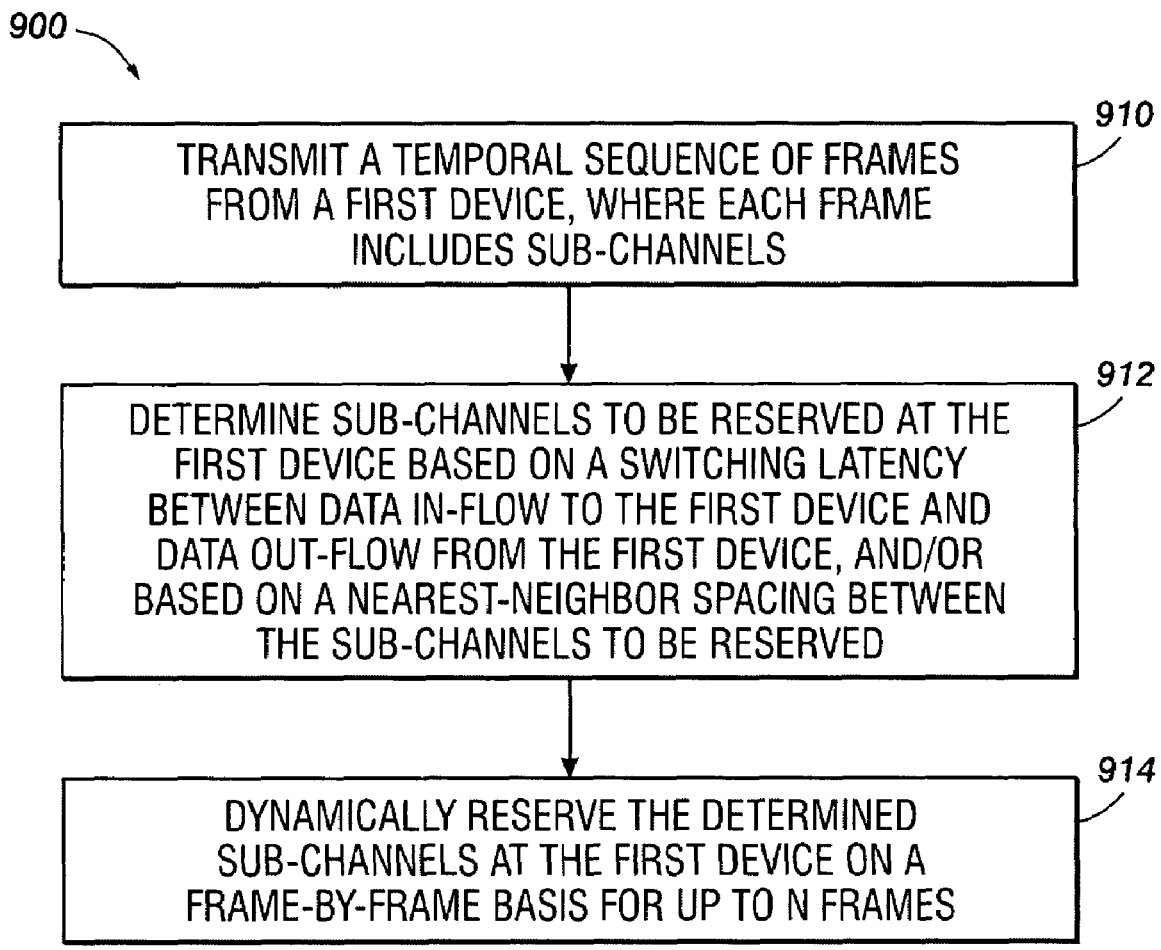
FIG. 9 is a flow chart illustrating a process for communicating between devices in accordance with an embodiment of the present invention.

We now describe embodiments of a process for communicating between devices. FIG. 9 is a flow chart illustrating a process 900 for communicating between devices in accordance with an embodiment of the present invention. During this process, a first device transmits a temporal sequence of frames, where each frame includes sub-channels (910). Next, the first device determines sub-channels to be reserved based on a switching latency between data in-flow to the first device and data out-flow from the first device, and/or based on a nearest-neighbor spacing between the sub-channels to be reserved (912). Then, the first device dynamically reserves the determined sub-channels on a frame-by-frame basis for up to N frames (914). Note that in some embodiments there may be additional or fewer operations, the order of the operations may be changed, and two or more operations may be combined into a single operation.

Figure 10:
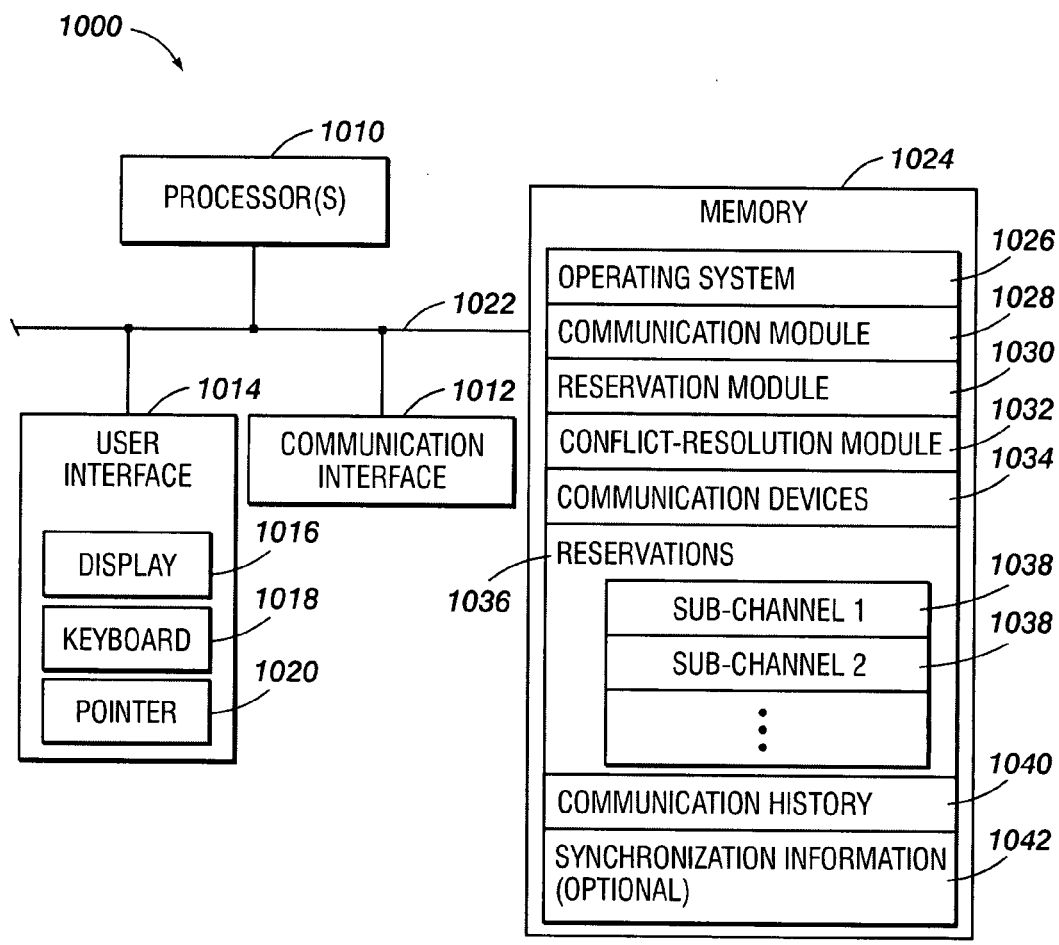
FIG. 10 is a block diagram illustrating a device in accordance with an embodiment of the present invention.

We now described devices for use in communication systems. FIG. 10 is a block diagram illustrating a device 1000 in accordance with an embodiment of the present invention. Device 1000 includes one or more processors 1010, a communication interface 1012, a user interface 1014, and one or more signal lines 1022 coupling these components together. Note that the one or more processing units 1010 may support parallel processing and/or multi-threaded operation, the communication interface 1012 may have a persistent communication connection, and the one or more signal lines 1022 may constitute a communication bus. Moreover, the user interface 1014 may include a display 1016, a keyboard 1018, and/or a pointer 1020, such as a mouse.

Memory 1024 in the device 1000 may include volatile memory and/or non-volatile memory. More specifically, memory 1024 may include ROM, RAM, EPROM, EEPROM, FLASH, one or more smart cards, one or more magnetic disc storage devices, and/or one or more optical storage devices. Memory 1024 may store an operating system 1026 that includes procedures (or a set of instructions) for handling various basic system services for performing hardware dependent tasks. In some embodiments, the operating system 1026 is a real-time operating system. The memory 1024 may also store procedures (or a set of instructions) in a communication module 1028. The communication procedures may be used for communicating with one or more computers, devices and/or servers, including computers, devices and/or servers that are remotely located with respect to the device 1000.

Memory 1024 may also include multiple program modules (or a set of instructions), including reservation module 1030 (or a set of instructions) and conflict-resolution module 1032 (or a set of instructions). Furthermore, memory 1024 may include a list of communication devices 1034 that are communicating with the device 1000, and/or reservations 1036 for sub-channels 1038. In addition, memory 1024 may include an optional communication history 1040, which may store times when information is received by one or more of the communication devices 1034. And in some embodiments, memory 1024 includes optional synchronization information 1042. For example, contention-free channel-access protocols typically require time synchronization to schedule collision-free transmissions over sub-channels.

Instructions in the various modules in memory 1024 may be implemented in a high-level procedural language, an object-oriented programming language, and/or in an assembly or machine language. The programming language may be compiled or interpreted, i.e, configurable or configured to be executed by the one or more processing units 1010.

Although device 1000 is illustrated as having a number of discrete items, FIG. 10 is intended to be a functional description of the various features that may be present in device 1000 rather than as a structural schematic of the embodiments described herein. In practice, and as recognized by those of ordinary skill in the art, the functions of the device 1000 may be distributed over a large number of servers or computers, with various groups of the servers or computers performing particular subsets of the functions. In some embodiments, some or all of the functionality of device 1000 may be implemented in one or more ASICs and/or one or more digital signal processors DSPs.

Device 1000 may include fewer components or additional components, two or more components may be combined into a single component, and/or a position of one or more components may be changed. In some embodiments the functionality of device 1000 may be implemented more in hardware and less in software, or less in hardware and more in software, as is known in the art.

Figure 11:
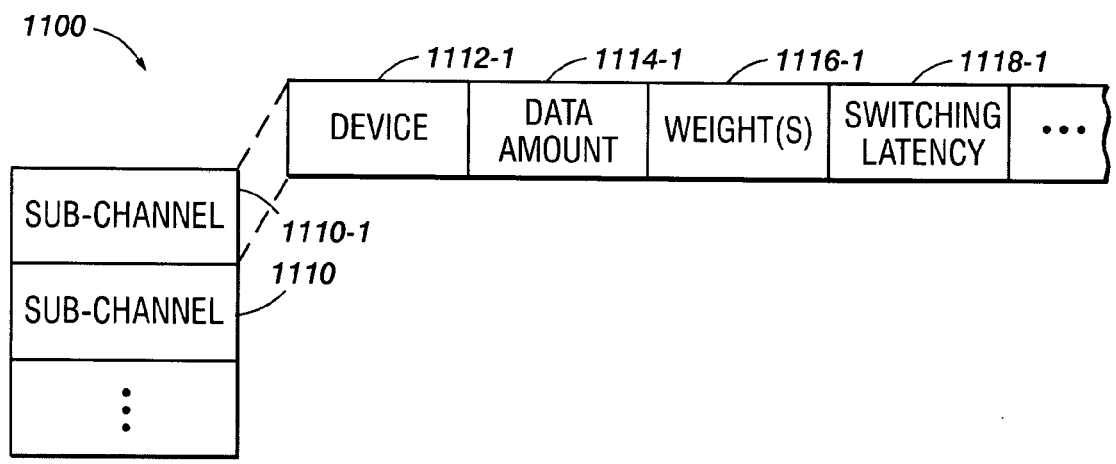
FIG. 11 is a block diagram illustrating a data structure in accordance with an embodiment of the present invention.

We now discuss data structures that may be used in device 1000. FIG. 11 is a block diagram illustrating a data structure 1100 in accordance with an embodiment of the present invention. This data structure may include communication histories for sub-channels 1110. Each of these communication histories may include a device 1112-1 that has currently reserved a sub-channel (such as sub-channel 1110-1), data amounts 1114-1, weights 1116-1 (which may be used to compute weighted averages), and/or switching latency 1118-1 of data. Note that that in some embodiments of the data structure 1100 there may be fewer or additional components, two or more components may be combined into a single component, and/or a position of one or more components is changed.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A communication system, comprising:
devices configured to communicate with each other through a temporal sequence of frames,
wherein each frame includes sub-channels;
wherein a given device in the devices is configured to select sub-channels to reserve based on a nearest-neighbor spacing between the sub-channels to be reserved, wherein the selected sub-channels reduce a weighted average of an amount of data received times an associated transmission waiting time; and
wherein the given device is configured to dynamically reserve the selected sub-channels on a frame-by-frame basis for up to N frames.

2. The communication system of claim 1, wherein the selected sub-channels are selected to reduce a variance of the nearest-neighbor spacing.

3. The communication system of claim 1, wherein the selected sub-channels are selected based on a greedy technique in which a number of sub-channels to be reserved in a given frame is selected based on a previous bandwidth requirement.

4. The communication system of claim 1, wherein dynamically reserving the selected sub-channels involves releasing a previously reserved sub-channel.

5. The communication system of claim 1, wherein dynamically reserving the selected sub-channels involves reserving a new sub-channel.

6. The communication system of claim 1, wherein the selected sub-channels are selected based on a switching latency between a data in-flow to the given device and a data out-flow from the given device.

7. The communication system of claim 6, wherein the selected sub-channels are selected based on a weighted average of the nearest-neighbor spacing and the switching latency.

8. The communication system of claim 6, wherein the selected sub-channels are selected based on the nearest-neighbor spacing for a first data class and the switching latency for a second data class.

9. The communication system of claim 1, wherein the sub-channels correspond to time slots, frequency bands, spread-spectrum codes, or directional antennas that transmit and receive the frames.

10. A communication device, comprising:
a transceiver configured to communicate with other devices through a temporal sequence of frames,
wherein each frame includes sub-channels;
wherein the communication device is configured to select sub-channels to reserve based on a nearest-neighbor spacing between the sub-channels to be reserved, wherein the selected sub-channels reduce a weighted average of an amount of data received times an associated transmission waiting time; and
wherein the communication device is configured to dynamically reserve the selected sub-channels on a frame-by-frame basis for up to N frames.

11. A method for communicating between devices, comprising:
transmitting a temporal sequence of frames from a first device, wherein each frame includes sub-channels;
determining sub-channels to reserve at the first device based on nearest-neighbor spacing between the sub-channels to be reserved, wherein the selected sub-channels reduce a weighted average of an amount of data received times an associated transmission waiting time; and
dynamically reserving the determined sub-channels at the first device on a frame-by-frame basis for up to N frames.

12. A communication system, comprising:
devices configured to communicate with each other through a temporal sequence of frames,
wherein each frame includes sub-channels;
wherein a given device in the devices is configured to select sub-channels to reserve based on a switching latency between data in-flow to the given device and data out-flow from the given device, wherein the selected sub-channels reduce a weighted average of an amount of data received times an associated transmission waiting time; and
wherein the given device is configured to dynamically reserve the selected sub-channels on a frame-by-frame basis for up to N frames.

13. The communication system of claim 12, wherein the selected sub-channels are selected based on a greedy technique in which a number of sub-channels to be reserved in a given frame is based on a previous bandwidth requirement.

14. The communication system of claim 12, wherein dynamically reserving of the selected sub-channels involves releasing a previously reserved sub-channel.

15. The communication system of claim 12, wherein dynamically reserving of the selected sub-channels involves reserving a new sub-channel.

16. The communication system of claim 12, wherein the selected sub-channels are selected based on a nearest-neighbor spacing between the sub-channels to be reserved.

17. The communication system of claim 16, wherein the selected sub-channels are selected to reduce a variance of the nearest-neighbor spacing.

18. The communication are selected based on system of claim 16, wherein the selected sub-channels a weighted average of the nearest-neighbor spacing and the switching latency.

19. The communication system of claim 16, wherein the selected sub-channels are selected based on the nearest-neighbor spacing for a first data class and the switching latency for a second data class.

20. The communication system of claim 12, wherein the sub-channels correspond to time slots, frequency bands, spread-spectrum codes, or directional antennas that transmit and receive the frames.

21. A communication device, comprising:
a transceiver configured to communicate with other devices through a temporal sequence of frames,
wherein each frame includes sub-channels;
wherein the communication device is configured to select sub-channels to reserve based on a switching latency between data in-flow to the communication device and data out-flow from the communication device, wherein the selected sub-channels reduce a weighted average of an amount of data received times an associated transmission waiting time; and
wherein the communication device is configured to dynamically reserve the selected sub-channels on a frame-by-frame basis for up to N frames.

22. A method for communicating between devices, comprising:

transmitting a temporal sequence of frames from a first device, wherein each frame includes sub-channels;

determining sub-channels to be reserved at the first device based on a switching latency between data in-flow to the first device and data out-flow from the first device, wherein the selected sub-channels reduce a weighted average of an amount of data received times an associated transmission waiting time; and dynamically reserving the determined sub-channels at the first device on a frame-by-frame basis for up to N frames.

\* \* \* \* \*